Dec. 24, 1957    A. J. GOLICK ET AL    2,817,620
DOWELING PROCESS
Filed June 22, 1954
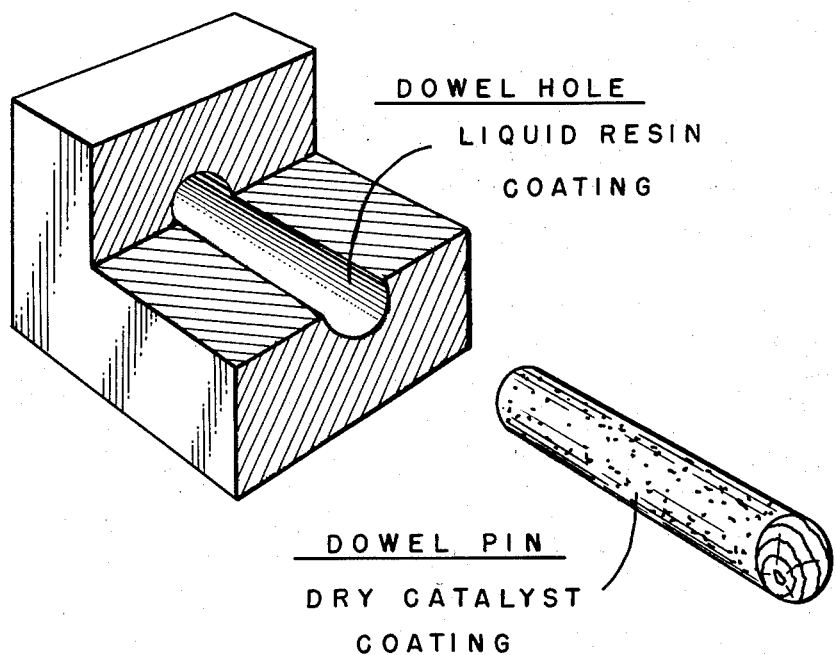
ALEXANDER J. GOLICK
GORDON E. BROWN    INVENTORS
BY Robert M. Dickey
ATTORNEY.

— # United States Patent Office 2,817,620
Patented Dec. 24, 1957

2,817,620
DOWELING PROCESS

Alexander J. Golick and Gordon E. Brown, Seattle, Wash., assignors to Monsanto Chemical Company, St. Louis, Mo., a corporation of Delaware Application June 22, 1954, Serial No. 438,590

5 Claims. (Cl. 154—118)

This invention relates to a method for gluing wood. More particularly, the invention relates to joining a plurality of pieces of wood by means of dowel pins.

In the assembly of wooden objects such as furniture, doors, etc. by means of dowel pins, it has been found that urea-formaldehyde condensates are the best adhesives from the point of view of bond-strength and durability.

One of the major problems in the use of the usual urea adhesives is the short pot life, i. e., the rapid cure of the resin to an insoluble infusible state after the addition of the curing catalyst. This limited pot life renders such adhesive impractical for use in most assembling of equipment because of the necessity of renewing adhesive before pot life expiration.

At least two methods have been used in an attempt to overcome the difficulties. One method is the use of latent curing catalysts, i. e., materials which do not develop catalytic activity immediately on addition to the resin. Unfortunately, these latent curing catalysts, if adjusted to provide adequate pot life, generally require heat to activate them and the use of heat is impractical for the usual dowel gluing process.

A second method has been to apply a solution of the catalyst to the dowel and to apply the resin to the dowel hole. This method has some merit but it has the major disadvantage that the solution swells the dowel. Further, the shape of the dowel is distorted to an hourglass shape by differential uptake on the end grain, the grain is raised and the dowel is swelled out of round, all of which makes the necessary good fit of the dowel in the hole impossible to attain.

One object of this invention is to provide a method for joining a plurality of pieces of wood by means of dowel pins.

A further object is to provide a method for dowelling wood in which the assembly time is not critical.

Another object is to provide a method for applying a urea adhesive in the dowel jointing of wood.

These and other objects are attained by impregnating dowels with dry solids acid or acid-reacting salt, applying an uncatalyzed urea-formaldehyde liquid adhesive to dowel holes in wood pieces, inserting the dowels in the holes and forcing the wood pieces into close contact.

The following examples are given in illustration and are not intended as limitations on the scope of this invention.

Example 1

Impregnate ⅝" fir dowels with aluminum sulfate powder of approximately 100-mesh by tumbling the dowels and aluminum sulfate together in a rotary tumbling device. For control purposes, it is convenient to add a small quantity (about 2% by weight based on the aluminum sulfate of an unreactive colored pigment such as a chrome green. As soon as the dowels are uniformly colored, the process may be stopped. A pickup of from 1 to 2 pounds of catalyst per 1000 square feet of dowel surface area is satisfactory.

In the gluing operation, a urea-formaldehyde condensate in the form of an aqueous solution containing about 50–70% solids by weight and having a pH of from about 5 to about 8 is inserted into the dowel holes, for best results, the holes should be free from chips and shavings and the resin solution should be injected into the holes to uniformly coat the surface.

After the adhesive has been placed in the dowel holes, the treated dowels are inserted and the entire assembly is clamped together with sufficient force to insure close contact between all surfaces to be united by the glue. As soon as this is accomplished, the force may be withdrawn and the operation is complete.

Within two hours, after the completion of the assembly operation, the resin is cured to such an extent the joints cannot be separated without almost 100% wood failure at the glue line. After two days, substantially no glue failure can be detected.

The resins to be used in the process of this invention are urea-formaldehyde condensates prepared by reacting 1 mol of urea with from 1.5 to 3 mols of formaldehyde at a pH of from 5 to 8 until a partial condensate is formed which is soluble in water and fusible. The reaction is carried out in an aqueous medium and the reaction product may be used per se without removing the water. If desired, the resin may be recovered from the aqueous reaction medium by conventional drying means, e. g., spray drying, and then re-dissolved in water when needed. For best results, the solids content of the aqueous solution of the resin should range between 50 and 70%.

If desired, various conventional additives such as fillers, pigments, flours, antifoaming agents, wetting agents, etc. may be added to the urea resin adhesives.

The catalyst used to impregnate the dowels should be a solid acid or acid-reacting salt in pulverulent form. Among such catalysts are aluminum sulfate, ammonium chloride, magnesium silicofluoride, boric acid, oxalic acid, phthalic acid, etc. The catalysts should be dry when applied to the dowels to prevent swelling of the dowels and lumping of the catalysts. They are most easily applied to the dowels by tumbling catalysts and dowels together in rotary tumbling apparatus. Such apparatus may be designed to provide a continuous process, the impregnated dowels being ejected from the tumbler with excess catalyst being automatically re-circulated to the tumbler. As a matter of convenience and control, a small amount of an inert inorganic or organic pigment such as chrome green, or toluidine red, may be added to the catalyst. When the dowels are uniformly colored, the impregnation is complete.

For effective catalytic action, the amount of the preferred type of catalyst on the dowels should range between 1 and 2 pounds per 1000 square feet of dowel surface area. The impregnated dowels may be stored indefinitely in a dry storage area without destroying their efficiency in the process of this invention.

The impregnation referred to throughout the foregoing is solid state impregnation whereby a finely-divided solid material is forced into the interstices between the wood fibers by mechanical action.

The invention is illustrated in the attached drawing which is an exploded view of a dowel pin assembly and includes a block of wood partly in section containing a dowel hole, the walls of said hole carrying a coating of liquid resin and a dowel pin impregnated and coated with a dry solid catalyst.

What is claimed is:

1. A process for gluing together a plurality of pieces of wood by means of wooden dowel pins, which comprises uniformly impregnating the dowel pins with a substantially dry solid pulverulent acidic compound, injecting an aqueous solution of an acid curing urea-formaldehyde condensate into dowel holes in the wood pieces, inserting the impregnated dowels into the holes, and forcing the pieces of wood and dowels together into close contact, said impregnation of the dowel pins being solid state impregnation whereby a finely divided solid acidic compound is forced into the interstices between the wood fibers by mechanical action.

2. A process as in claim 1 wherein the acidic compound is aluminum sulfate.

3. A process as in claim 1 wherein the amount of acidic compound impregnated in the dowel pins ranges from 1 to 2 pounds per 1000 square feet of dowel surface area.

4. A process as in claim 1 wherein an inert pigment is added to the acidic compound.

5. A process for gluing together a plurality of pieces of wood by means of wooden dowel pins, which comprises solid state impregnation of wooden dowel pins by tumbling wooden dowel pins with a substantially dry solid pulverulent acidic compound to uniformly impregnate the surfaces thereof with the acidic compound, injecting an aqueous solution of an acid curing urea-formaldehyde condensate into the dowel holes in the wood pieces, inserting the impregnated dowels in the holes, and forcing the pieces of wood and dowels together into close contact.

References Cited in the file of this patent

UNITED STATES PATENTS

| | | |
|---|---|---|
| 1,994,073 | Hartman et al. | Mar. 12, 1935 |
| 2,015,806 | Menger | Oct. 1, 1935 |
| 2,053,382 | Stickley | Sept. 8, 1936 |
| 2,290,946 | Dearing et al. | July 28, 1942 |
| 2,414,415 | Rhodes | Jan. 14, 1947 |
| 2,489,145 | Lieb | Nov. 22, 1949 |
| 2,495,043 | Willey et al. | Jan. 17, 1950 |
| 2,690,879 | Snyder | Oct. 5, 1954 |